United States Patent
Rafferty et al.

(10) Patent No.: US 12,261,837 B2
(45) Date of Patent: Mar. 25, 2025

(54) TOKENIZING AUTHENTICATION INFORMATION

(71) Applicant: Capital One Services, LLC, McLean, VA (US)

(72) Inventors: Galen Rafferty, Mahomet, IL (US);
Austin Walters, Savoy, IL (US);
Jeremy Goodsitt, Champaign, IL (US);
Anh Truong, Champaign, IL (US);
Grant Eden, Menlo Park, CA (US)

(73) Assignee: Capital One Services, LLC, McLean, VA (US)

( * ) Notice: Subject to any disclaimer, the term of this patent is extended or adjusted under 35 U.S.C. 154(b) by 553 days.

(21) Appl. No.: 17/343,340

(22) Filed: Jun. 9, 2021

(65) Prior Publication Data

US 2022/0400108 A1   Dec. 15, 2022

(51) Int. Cl.
*H04L 29/06* (2006.01)
*H04L 9/40* (2022.01)

(52) U.S. Cl.
CPC ........ *H04L 63/0853* (2013.01); *H04L 63/083* (2013.01); *H04L 63/0861* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 8,255,984 B1 | 8/2012 | Ghostine et al. | |
| 9,554,279 B1* | 1/2017 | Kremer | H04W 4/029 |
| 10,146,931 B1* | 12/2018 | Kronrod | H04L 63/0846 |
| 10,291,610 B2* | 5/2019 | Chang | H04L 63/0861 |
| 10,701,067 B1* | 6/2020 | Ziraknejad | H04W 12/63 |
| 11,822,633 B1* | 11/2023 | Desai | G06V 40/20 |
| 2003/0217288 A1* | 11/2003 | Guo | G06F 21/33 726/10 |
| 2005/0138362 A1* | 6/2005 | Kelly | H04L 63/0807 713/156 |
| 2006/0059546 A1* | 3/2006 | Nester | H04L 63/0815 726/5 |
| 2007/0162337 A1* | 7/2007 | Hawkins | G06Q 30/0235 705/14.27 |

(Continued)

OTHER PUBLICATIONS

Passpack found at https://www.youtube.com/watch?v=QMHrbxQKG9k, author unknown, 2009 (Year: 2009).*

(Continued)

*Primary Examiner* — Piotr Poltorak
(74) *Attorney, Agent, or Firm* — Harrity & Harrity, LLP

(57) ABSTRACT

In some implementations, a user device may determine that the user device was granted access to a first set of resources by a first authentication process. The user device may receive a request to access a second set of resources. The user device may generate, based on the request, a token that indicates that the user device was granted access to the first set of resources by the first authentication process. The user device may transmit, based on the request, the token to a server device to cause a second authentication process to be performed on the token. The user device may receive, from the server device, access information indicating whether access to the second set of resources is granted or denied based on transmitting the token to the server device.

20 Claims, 9 Drawing Sheets

(56) References Cited

U.S. PATENT DOCUMENTS

| | | | | |
|---|---|---|---|---|
| 2016/0205094 A1* | 7/2016 | Harthattu | ............ | H04W 12/065 |
| | | | | 455/411 |
| 2017/0171755 A1* | 6/2017 | Grange | ............... | H04W 12/068 |
| 2018/0255057 A1* | 9/2018 | Hein | ........................ | H04L 67/02 |
| 2019/0357080 A1* | 11/2019 | Shanbhag | ............ | H04W 12/088 |
| 2022/0217124 A1* | 7/2022 | Fryer | ...................... | H04L 63/10 |
| 2023/0089689 A1* | 3/2023 | Pons Bordes | ........... | G06F 21/32 |
| | | | | 726/18 |

OTHER PUBLICATIONS

Passpack2 "Introduction to Passpack Password Manager" found at https://www.youtube.com/watch?v=z9ISUYhVVHA (Year: 2019).*

* cited by examiner

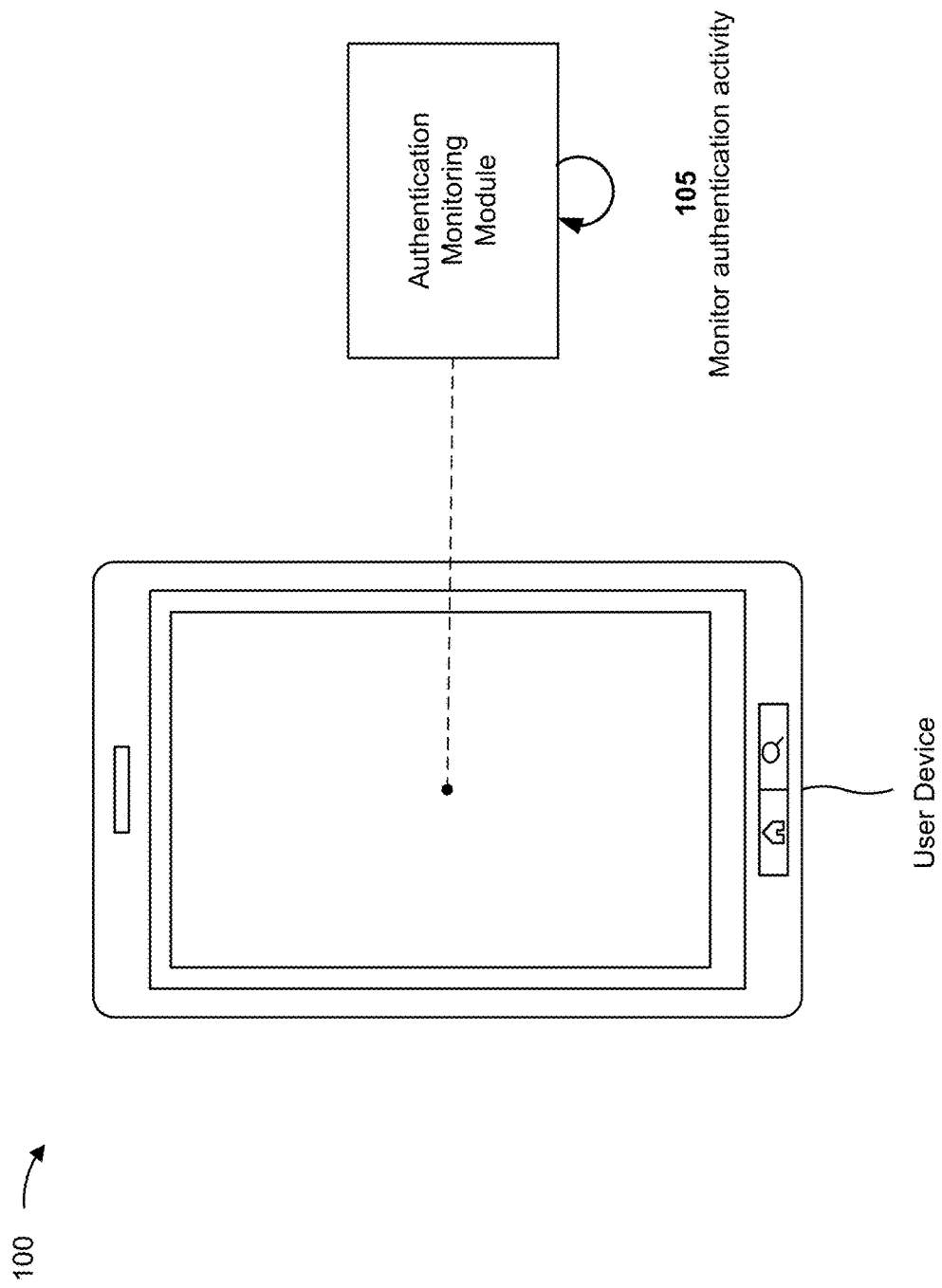

TOKENIZING AUTHENTICATION INFORMATION

BACKGROUND

An identity provider manages identification information for users and/or user devices associated with resources within a federated or distributed network. The identity provider may also provide an authentication process to grant or deny access to a resource.

SUMMARY

In some implementations, a user device includes one or more memories, and one or more processors, coupled to the one or more memories, configured to: receive one or more authentication credentials and a first request to access a first resource; cause, based on the first request, a first authentication process to be performed on the one or more authentication credentials; determine that the user device was granted access to the first resource based on causing the first authentication process to be performed; receive a second request to access a second resource; generate, based on the second request, a token that indicates that the one or more authentication credentials were authenticated by the first authentication process; transmit, based on the second request, the token to a server device to cause a second authentication process to be performed on the token; and receive, from the server device, information indicating whether access to the second resource is granted or denied based on transmitting the token to the server device.

In some implementations, a method of tokenizing authentication information includes determining, by a user device, that the user device was granted access to a first set of resources by a first authentication process; receiving, by the user device, a request to access a second set of resources; generating, by the user device and based on the request, a token that indicates that the user device was granted access to the first set of resources by the first authentication process; transmitting, by the user device and based on the request, the token to a server device to cause a second authentication process to be performed on the token; and receiving, by the user device and from the server device, access information indicating whether access to the second set of resources is granted or denied based on transmitting the token to the server device.

In some implementations, a non-transitory computer-readable medium storing a set of instructions includes one or more instructions that, when executed by one or more processors of a server device, cause the server device to: receive, from a user device, a token and a request to access a resource, wherein the token indicates that the user device was granted access to another resource by a particular authentication process; process the token to identify information associated with the particular authentication process; and grant or deny access to the resource based on the information associated with the particular authentication process.

BRIEF DESCRIPTION OF THE DRAWINGS

FIGS. 1A-1E are diagrams of an example implementation relating to tokenizing authentication information.

DETAILED DESCRIPTION

Figure 1B:
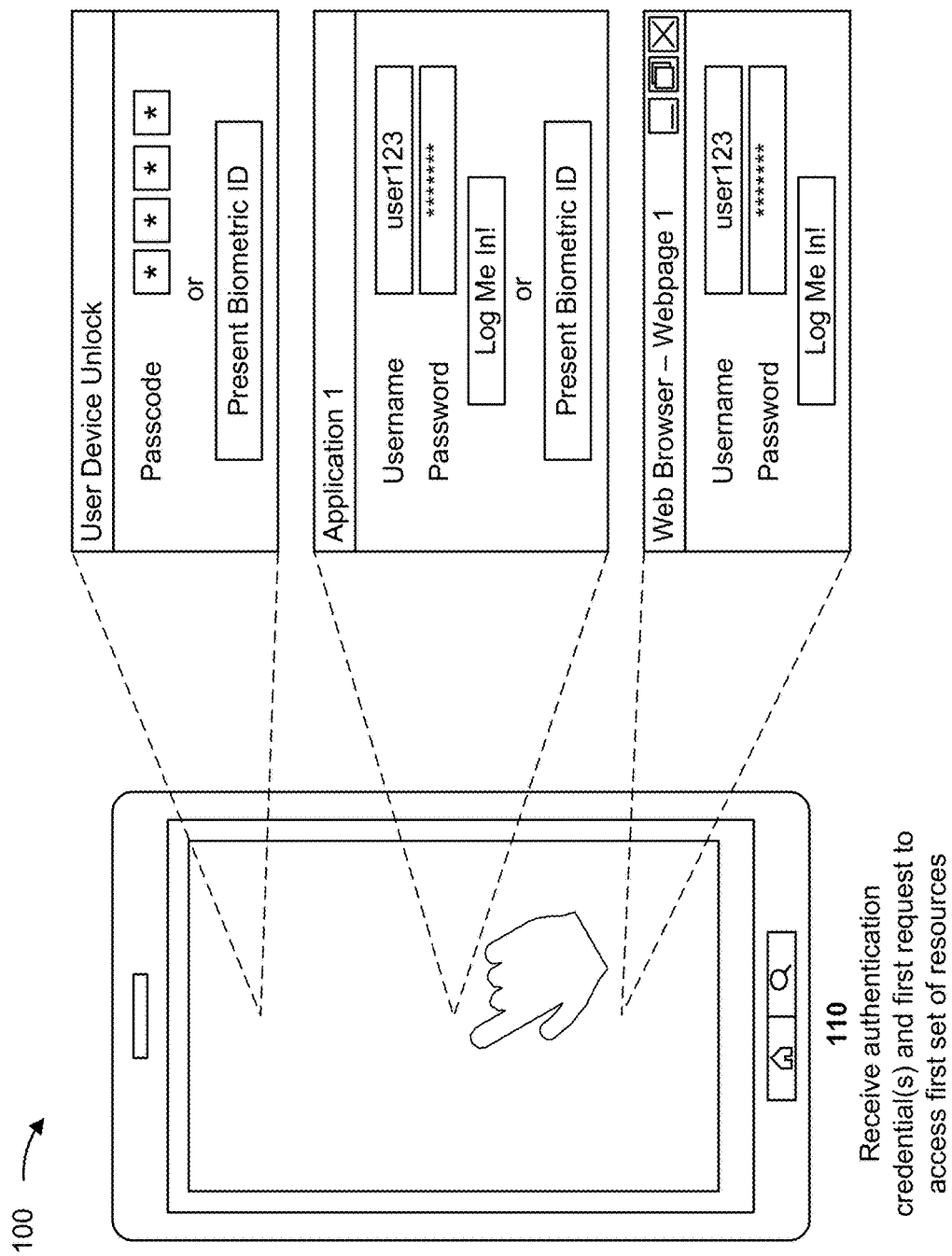

The following detailed description of example implementations refers to the accompanying drawings. The same reference numbers in different drawings may identify the same or similar elements.

An identity provider may provide identification and authentication services for a user to access, via a user device, a resource (e.g., a network service) of another entity. For example, a user may establish a username and password that is maintained by the identity provider. When the user wishes to access the resource of the other entity, the user may enter, via a user interface of the user device, the username and password into the user device, which may provide the username and password to the identity provider. The identity provider may authenticate the username and password and may provide, to the user device, a ticket indicating that the user device has been authenticated by the identity provider. The user device then may send the ticket to the other entity with a request to access the resource. The other entity may send the ticket to the identity provider to validate the ticket. The identity provider then may provide, to the other entity, a validation message that indicates whether the ticket is valid. The other entity may grant access to the resource when the ticket is valid and may deny access to the resource when the ticket is not valid. Consequently, as illustrated by this example, using the identity provider to provide identification and authentication services results in a significant amount of network traffic between the user device, the identity provider, and the other entity. Further, this results in a significant use of computing resources (e.g., processing resources, memory resources, communication resources, and/or power resources, among other examples) of the user device, the identity provider, and the other entity.

Some implementations described herein provide a user device and a server device. The user device may determine that the user device was granted access to a first set of resources (e.g., that includes a hardware resource, a software resource, and/or a network resource, among other examples) by a first authentication process (e.g., a passcode authentication process, a biometric authentication process, and/or a username/password authentication process, among other examples). The user device then may receive a request to access a second set of resources (e.g., that includes a hardware resource, a software resource, and/or a network resource, among other examples) and may generate, based on the request, a token that indicates that the user device was granted access to the first set of resources by the first authentication process. The user device may transmit the token to the server device, which may process the token using a second authentication process (e.g., a token authentication process). The server device, based on a result of the second authentication process, may grant or deny access to the second set of resources (e.g., allow or disallow the user device to access the second set of resources).

In this way, the server device may determine whether to grant or deny access to the second set of resources based on a previous authentication process, but without communicating with a third party platform, such as an identity provider. This simplifies the authentication process for accessing the second set of resources and provides at least a same level of security as that provided by the previous authentication process (e.g., by relying on the result of the previous authentication process). Additionally, the token transmitted by the user device to the server device does not include sensitive information (e.g., authentication credentials), which reduces a likelihood of potential security issues resulting from transmitting the token, even if the token were to be intercepted by a bad actor.

Further, some implementations reduce an amount of network traffic that needs to be communicated in order to determine whether the user device should be granted access to the second set of resources (e.g., because only the token is transmitted from the user device to the server device), as compared to that of a process associated with an identity provider (e.g., that requires a ticket to be communicated from the identity provider to a user device, then to another entity, and then back to the identity provider). This also may reduce an amount of computing resources (e.g., processing resources, memory resources, communication resources, and/or power resources, among other examples) that need to be used (e.g., by the user device and/or the server device) to determine whether the user device should be granted access to the second set of resources.

FIGS. 1A-1E are diagrams of an example 100 associated with tokenizing authentication information. As shown in FIGS. 1A-1E, example 100 includes a user device, a first server device, a second server device, and a host platform. These devices are described in more detail in connection with FIGS. 2 and 3.

As shown in FIG. 1A, the user device may include an authentication monitoring module (or another similar module or component). As shown by reference number 105, the user device, when using the authentication monitoring module, may monitor authentication activity associated with the user device. For example, the user device may monitor authentication activity associated with unlocking the user device, initiating an application, and/or loading a webpage, as described in further detail herein.

As shown in FIG. 1B, a user of the user device may interact with a user interface of the user device (e.g., a touch and/or display screen of the user device) to navigate the user interface and/or to input information into the user device. For example, the user may interact with the user interface of the user device to perform an unlock operation to allow the user to access a home screen of the user device, an application of the user device, and/or a hardware resource of the user device (e.g., a hard drive, a camera, and/or a microphone of the user device). As another example, the user may interact with the user interface of the user device to perform an application initiation operation to cause an application to run on the user device and/or to cause the application to access a network resource (e.g., that is hosted by the host platform). In another example, the user may interact with the user interface of the user device to perform a webpage load operation to cause a web browser of the user device to load a webpage and/or to access a network resource (e.g., that is hosted by the host platform.

As further shown in FIG. 1B, and by reference number 110, the user device may receive one or more authentication credentials (e.g., that are associated with the user of the user device) and/or a first request for access to a first set of resources. For example, as shown in FIG. 1B and as part of an unlock operation, the user may enter authentication credentials that include a passcode associated with the user and/or one or more biometric parameters associated with the user into a "User Device Unlock" prompt displayed by the user device to request access to the home screen of the user device, to an application of the user device, and/or to a hardware component of the user device. The passcode may include a numerical string, a text string, and/or a personal identification number (PIN), among other examples. The one or more biometric parameters may include a fingerprint scan, an iris scan, a voice scan, and/or a face scan, among other examples, that are obtained by at least one biometric sensor of the user device.

As another example, as shown in FIG. 1B and as part of an application initiation operation, the user may enter authentication credentials that include a username and a password associated with the user and/or one or more biometric parameters associated with the user into an "Application 1" prompt displayed by the user device to request access to initiate Application 1 on the user device. In an additional example, as shown in FIG. 1B and as part of a webpage load operation, the user may enter authentication credentials that include a username and a password associated with the user into a "Webpage 1" prompt displayed by a web browser of the user device to request access to load Webpage 1 on the web browser of the user device. Other examples are contemplated as well, where the one or more authentication credentials include inputs associated with multi-factor authorization prompts, inputs associated with completely automated public Turing test to tell computers and humans apart (CAPTCHA) prompts, and/or inputs associated with security question prompts, and/or where the first set of resources includes at least one hardware resource (e.g., a hard drive, a camera, and/or a microphone associated with the user device), at least one software resource (e.g., an application and/or a computer program of the user device), and/or at least one network resource (e.g., information hosted by the host platform, such as information associated with a social media account, an email account, a financial account, and/or a streaming multimedia account).

Figure 1C:
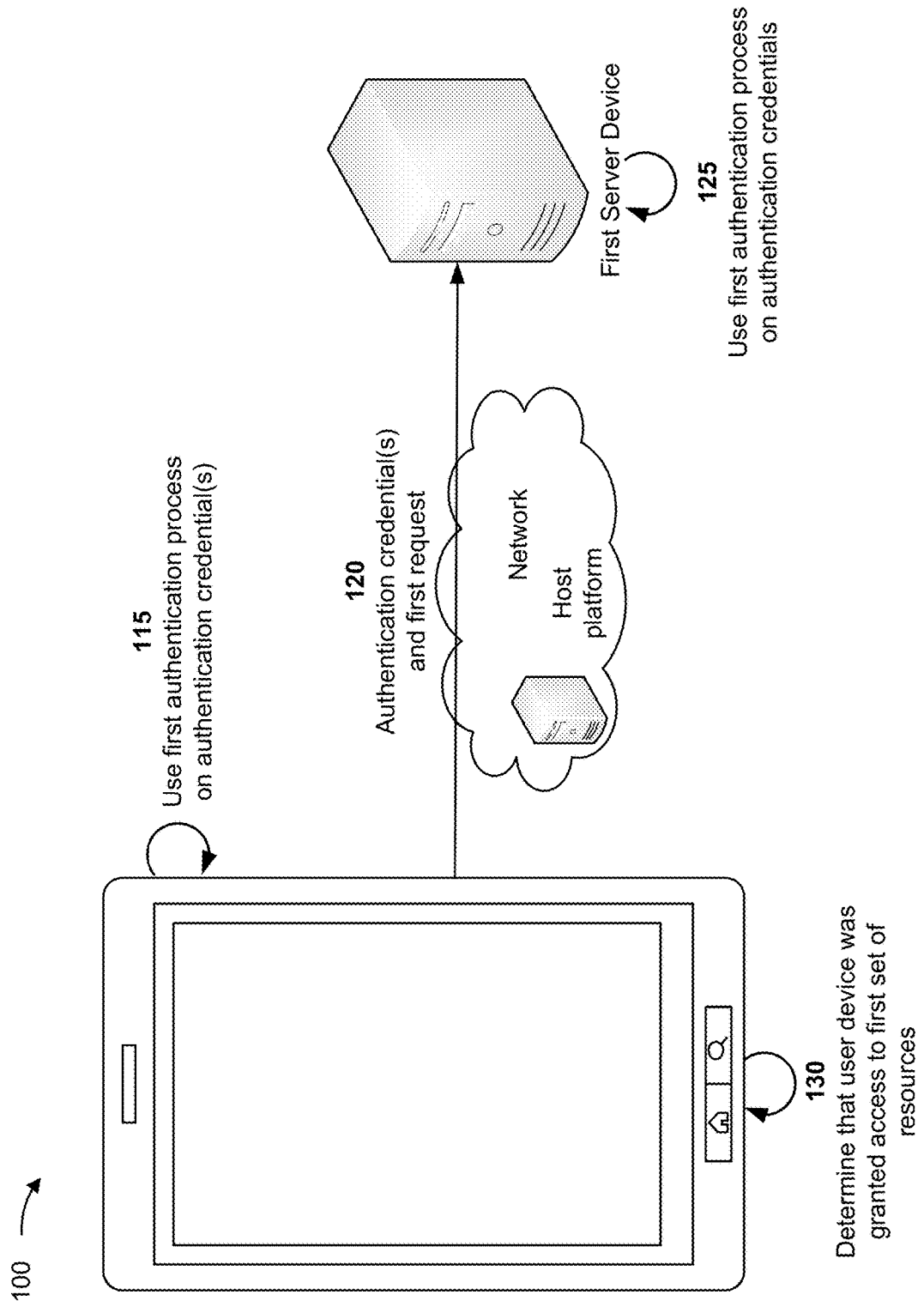

In some implementations, the user device may cause a first authentication process to be performed on the one or more authentication credentials (e.g., that were received by the user device) by the user device or the first server device. As shown in FIG. 1C, and by reference number 115, the user device may use (e.g., based on the first request) the first authentication process to process the one or more authentication credentials (e.g., to authenticate the one or more authentication credentials). For example, when the user device receives a passcode (e.g., as part of an unlock operation described above), the user device may process the passcode using a passcode authentication technique. As another example, when the user device receives one or more biometric parameters (e.g., as part of an unlock operation and/or an application initiation operation described above), the user device may process the one or more biometric parameters using at least one biometric authentication technique (e.g., a fingerprint authentication technique, an iris authentication technique, a voice authentication technique, and/or a facial authentication technique). Accordingly, the user device may determine whether to grant or deny access to the first set of resources (e.g., a home screen of the user device, an application of the user device, and/or a hardware resource of the user device) based on a result of the first authentication process. For example, when the user device determines that the one or more authentication credentials (e.g., the passcode or the one or more biometric parameters) are valid, the user device may grant access to the first set of resources (e.g., allow the user device to access the first set of resources). Alternatively, when the user device determines that the one or more authentication credentials (e.g., the passcode or the one or more biometric parameters) are not valid, the user device may deny access to the first set of resources (e.g., prevent the user device from accessing the first set of resources).

Additionally, or alternatively, as further shown in FIG. 1C, and by reference number 120, the user device may transmit the one or more authentication credentials and/or the first request to the first server device. As shown by reference number 125, the first server device may use (e.g., based on the first request) the first authentication process to process the one or more authentication credentials (e.g., to authenticate the one or more authentication credentials). For example, when the user device receives a username and a password and a first request (e.g., as part of an application initiation operation or a webpage load operation described herein), the user device may send the username and the password and/or the first request to the first server device via a network, such as the Internet. The first server device may process the username and the password using a username/password authentication technique (e.g., a username/password hashing authentication technique). Accordingly, the first server device may determine whether to grant or deny access to the first set of resources (e.g., that includes information stored and/or maintained by the host platform) based on a result of the first authentication process. For example, when the first server device determines that the one or more authentication credentials (e.g., the username and the password) are valid, the first server device may grant access to the first set of resources (e.g., allow the user device to access the first set of resources). Alternatively, when the first server device determines that the one or more authentication credentials (e.g., the username and the password) are not valid, the first server device may deny access to the first set of resources (e.g., prevent the user device from accessing the first set of resources).

As further shown in FIG. 1C, and by reference number 130, the user device may determine that the user device was granted access to the first set of resources (e.g., based on causing the first authentication process to be performed by the user device or the first server device). For example, when the user device processed the one or more authentication credentials (e.g., as described above in relation to reference number 115), the user device may determine that user device was granted access to the first set of resources based on the user device validating the one or more authentication credentials using the first authentication process. As another example, when the first server device processed the one or more authentication credentials (e.g., as described above in relation to reference number 125), the first server device may send, based on the first server device using the first authentication process to validate the one or more authentication credentials, validation information to the user device that indicates that the first server device granted access to the first set of resources. Accordingly, the user device may determine, based on the validation information, that the user device was granted access to the first resource.

In some implementations, the user device (e.g., using the authentication monitoring module) may monitor a data structure (e.g., that is included in the user device and/or accessible to the user device, such as via the host platform) to determine that the user device was granted access to the first set of resources. The data structure may store and/or maintain authentication event information associated with the user device. For example, the data structure may include a plurality of entries associated with a plurality of authentication events that the user device caused to be performed (e.g., to allow the user device to access hardware resources, software resources, and/or network resources, among other examples). An entry, of the plurality of entries, may include information that indicates a request for a set of resources, the set of resources, a time of the request, a type of authentication credentials presented with the request (e.g., whether the authentication credentials included a passcode, a biometric parameter, and/or a username/password), an identifier associated with an authentication process used to process the authentication credentials (e.g., a name of the authentication process), and/or a validation outcome associated with the authentication process (e.g., a grant or denial of access to the set of resources). In some implementations, the user device (e.g., using the authentication monitoring module) may determine, based on monitoring the data structure, that an entry in the data structure is associated with the one or more authentication credentials and/or the first request (e.g., that were received by the user device, as described herein in relation to FIG. 1B and reference number 110), the first set of resources, and/or the first authentication process. Accordingly, the user device may identify and process the entry to determine a validation outcome associated with the first authentication process (e.g., a grant or denial of access to the first set of resources). In this way, the user device may determine that the one or more authentication credentials were authenticated by the first authentication process and/or that the user device was granted access to the first set of resources by the first authentication process. Alternatively, the user device may determine that the one or more authentication credentials were not authenticated by the first authentication process and/or that the user device was denied access to the first set of resources by the first authentication process.

In some implementations, the user device (e.g., using the authentication monitoring module) may monitor an electronic message account (e.g., that is included in the user device and/or accessible to the user device, such as via the host platform) to determine that the user device was granted access to the first set of resources. The electronic message account may be an email account, a text messaging account, an instant messaging account, a voice messaging account, a notification messaging account, and/or a secure (e.g., encrypted) messaging account, among other examples. In some implementations, the user device and/or the first server device may generate and send, to the messaging account, a message associated with processing the one or more authentication credentials using the first authentication process. For example, the message may include information that indicates the first request, the first set of resources, a time of the first request, a type of the one or more authentication credentials, an identifier associated with the first authentication process, and/or a validation outcome associated with the first authentication process. Accordingly, the user device may identify and process the message to determine the validation outcome associated with the first authentication process (e.g., a grant or denial of access to the first set of resources). In this way, the user device may determine that the one or more authentication credentials were authenticated by the first authentication process and/or that the user device was granted access to the first set of resources by the first authentication process. Alternatively, the user device may determine that the one or more authentication credentials were not authenticated by the first authentication process and/or that the user device was denied access to the first set of resources by the first authentication process.

In some implementations, the user device (e.g., using the authentication monitoring module) may monitor a web browser of the user device to determine that the user device was granted access to the first set of resources. For example, the user device may obtain information related to a webpage that is presented on the user device via the web browser (e.g., by scraping the webpage). The webpage may include information that indicates the first request, the first set of resources, a time of the first request, a type of the one or more authentication credentials, an identifier associated with the first authentication process, and/or a validation outcome associated with the first authentication process. Accordingly, the user device may process the webpage to determine the validation outcome associated with the first authentication process (e.g., a grant or denial of access to the first set of resources). In this way, the user device may determine that the one or more authentication credentials were authenticated by the first authentication process and/or that the user device was granted access to the first set of resources by the first authentication process. Alternatively, the user device may determine that the one or more authentication credentials were not authenticated by the first authentication process and/or that the user device was denied access to the first set of resources by the first authentication process.

In some implementations, the user device (e.g., using the authentication monitoring module) may monitor communications between the user device and the first set of resources to determine that the user device was granted access to the first set of resources. For example, the user device may identify one or more communications associated with the user device accessing the first set of resources (e.g., that is hosted by the host platform) and therefore may determine that the one or more authentication credentials were authenticated by the first authentication process and/or that the user device was granted access to the first set of resources by the first authentication process.

Figure 1D:
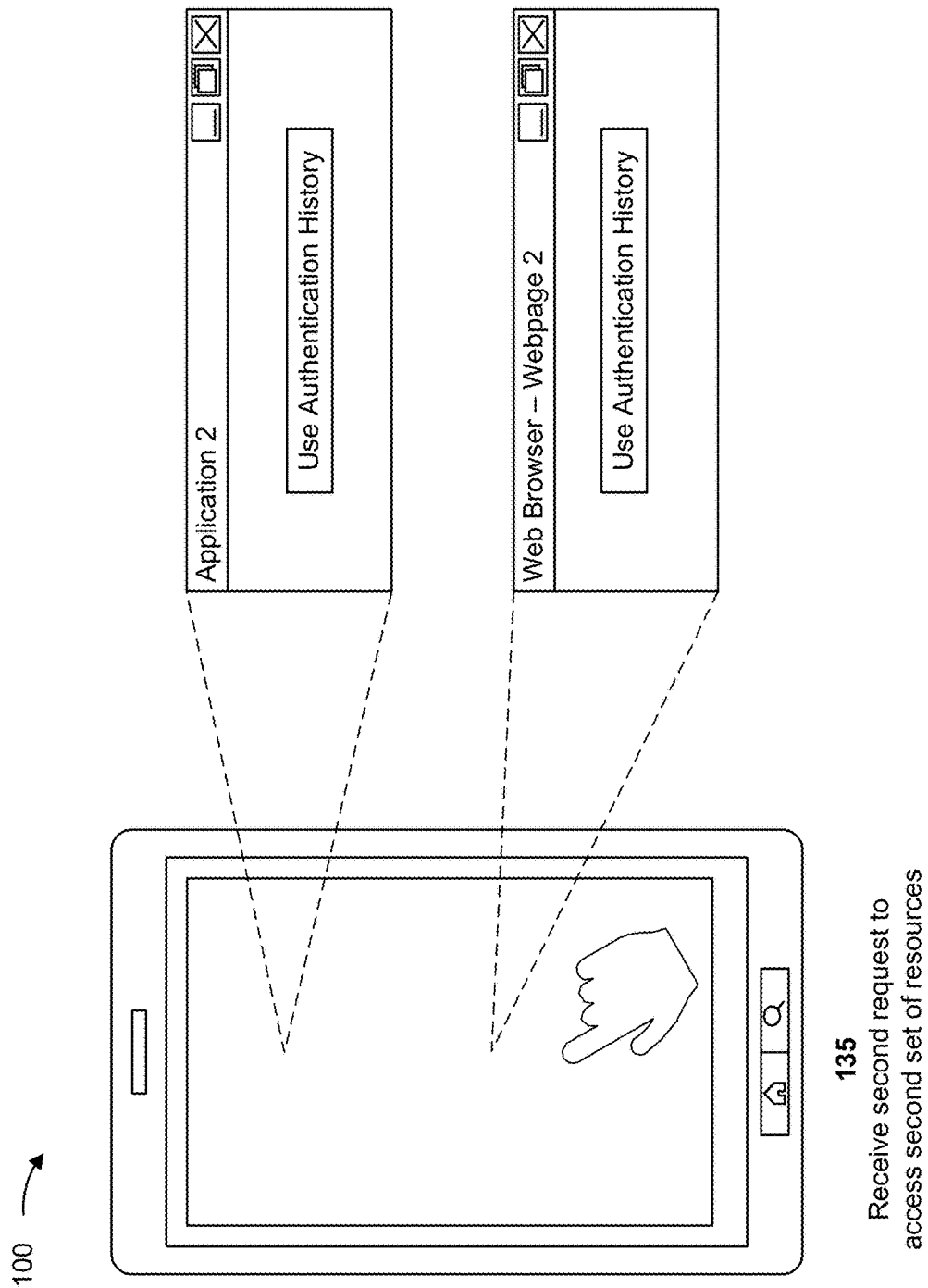

As shown in FIG. 1D, and by reference number 135, the user device may receive a second request to access a second set of resources (e.g., after receiving the first request for the first set of resources). The second set of resources may include at least one hardware resource, at least one software resource, and/or at least one network resource, among other examples. For example, as shown in FIG. 1D, the user of the user device may interact with the user interface of the user device to perform an application initiation operation and/or a webpage load operation. As part of the application initiation operation, the user may select a "Use Authentication History" of an "Application 2" prompt displayed by the user device to request access to initiate Application 2 on the user device. As part of the webpage load operation, the user may select a "Use Authentication History" of a "Webpage 2" prompt displayed via a "Web Browser" of the user device to request access to load Webpage 2 on the Web Browser of the user device. In this way, the user does not need to input authentication credentials into the user interface of the user device.

Figure 1E:
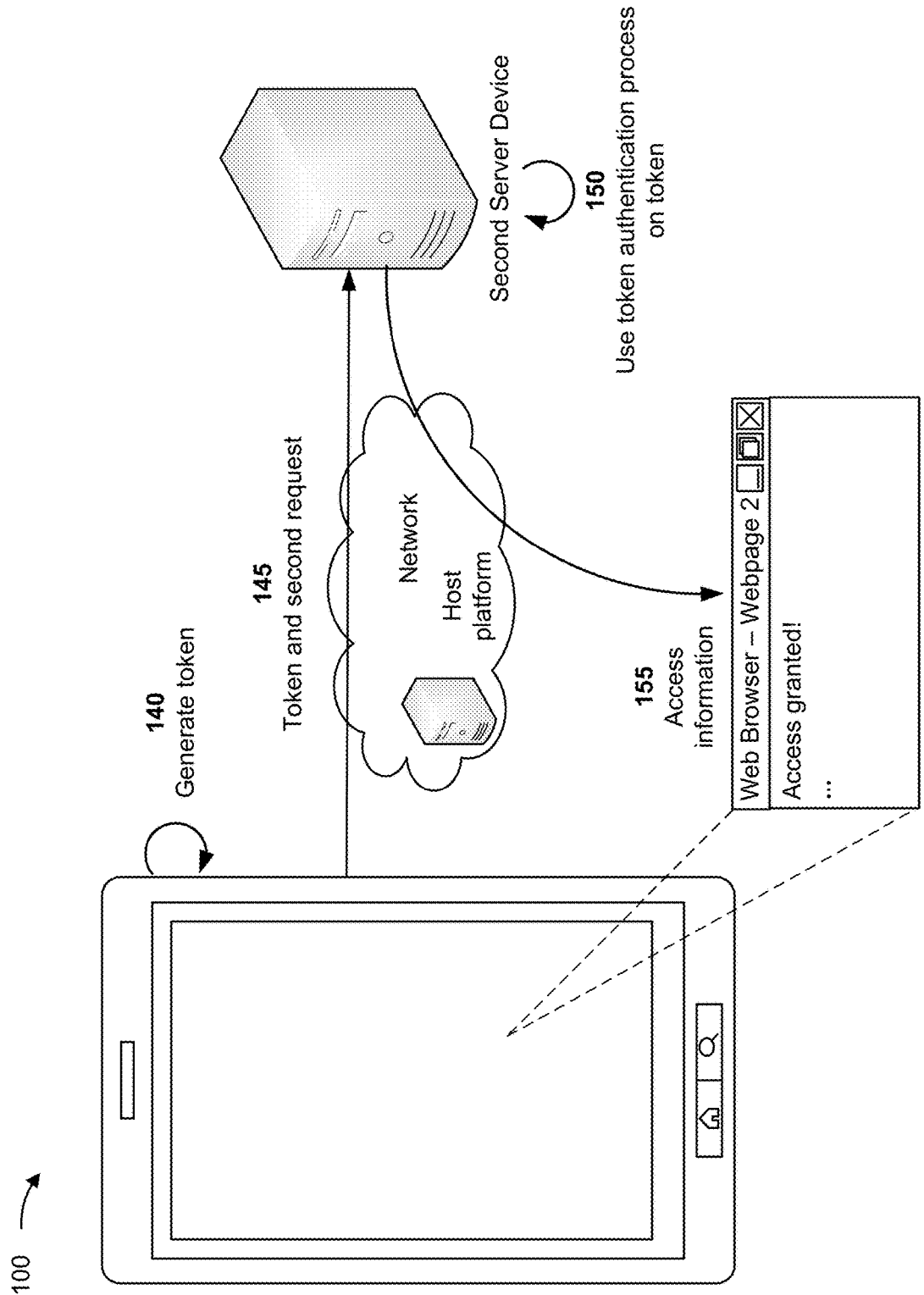

As shown in FIG. 1E, and by reference number 140, the user device may generate a token (e.g., based on the second request and/or based on determining that the user device was granted access to the first set of resources). The token may indicate that the one or more authentication credentials were authenticated by the first authentication process and/or that the user device was granted access to the first set of resources (e.g., by the first authentication process). For example, the token may include information identifying the user device, information indicating that the first authentication process was used to grant access to the first set of resources, information indicating a time when the first authentication process was performed, information identifying a location (e.g., a physical location or a location on a network) of the user device (e.g., when the first authentication process was performed), and/or information identifying one or more connection characteristics of the user device. The one or more connection characteristics may indicate one or more characteristics of a wireless connection (e.g., a Wi-Fi connection, a cellular connection, and/or a Bluetooth connection, among other examples) and/or a wired connection between the user device and another device (e.g., a router, a base station, a peripheral device, and/or another user device, among other examples), such as an identifier associated with the connection, a signal strength associated with the connection, a bandwidth associated with the connection, and/or a latency associated with the connection, among other examples. In some implementations, the user device may encrypt the token, or some or all of the information to be included in the token, to cause the token to be an encrypted token.

As further shown in FIG. 1E, and by reference number 145, the user device may transmit the token and/or the second request to a second server device. As shown by reference number 150, the second server device may use (e.g., based on the second request) a token authentication process to process the token (e.g., to authenticate the token). For example, the user device may send the token and/or the second request to the second server device via a network, such as the Internet. The second server device may process the token to identify information associated with the first authentication process and may determine whether to grant or deny access to the second set of resources (e.g., that includes information stored and/or maintained by the host platform) based on the information associated with the first authentication process. In some implementations, when the token is an encrypted token, the second server device may process, using a decryption algorithm, the token to identify the information associated with the first authentication process.

In some implementations, the second server device may determine, based on the information associated with the first authentication process, a time when the first authentication process was performed. The second server device may determine whether the time is within an approved time window (e.g., greater than or equal to a lower bound of the approved time window and/or less than or equal to an upper bound of the approved time window) and may grant or deny access to the second set of resources based on determining whether the time is within the approved time window. For example, when the second server device processes the information associated with the first authentication process at time t seconds, the time window is x seconds, and the time when the first authentication process was performed y seconds before time t (e.g., at time t−y seconds), the second server device may grant access to the second set of resources when the second server device determines that y≤x. Alternatively, the second server device may deny access to the second set of resources when the second server device determines that y>x.

In some implementations, the second server device may determine, based on the information associated with the first authentication process, a location of the user device (e.g., a physical location of the user device or a location of the user device on a network) when the first authentication process was performed. The second server device may determine whether the location is within an approved location area and may grant or deny access to the second set of resources based on determining whether the location is within the approved location area.

For example, the second server device may determine, based on the information associated with the first authentication process, geographical coordinates (e.g., a longitude and/or a latitude) of the user device when the first authentication process was performed and may determine whether the geographical coordinates are within an approved geographical area (e.g., that is associated with a home of the user, a place of employment of the user, and/or an otherwise secure area). The second server device may grant access to the second set of resources when the second server device determines that the geographical coordinates are within the approved geographical area. Alternatively, the second server device may deny access to the second set of resources when the second server device determines that the geographical coordinates are not within the approved geographical area. As another example, the second server device may determine, based on the information associated with the first authentication process, a network location of the user device when the first authentication process was performed and may determine whether the network location is within an approved network location area (e.g., whether the network location is a secure subdomain of a secure network domain, or other type of secure network configuration). The second server device may grant access to the second set of resources when the second server device determines that the network location is within the approved network location area. Alternatively, the second server device may deny access to the second set of resources when the second server device determines that the network location is not within the approved network location area.

In some implementations, the second server device may determine, based on the information associated with the first authentication process, one or more connection characteristics of the user device when the first authentication process was performed. The second server device may grant or deny access to the second set of resources based on the one or more connection characteristics of the user device. For example, the second server device may determine that the user device was connected to a particular Wi-Fi network (e.g., a home Wi-Fi network associated with the user device) when the first authentication process was performed, and may therefore grant access to the second set of resources. As another example, the second server device may determine that the user device was connected to at least one other device (e.g., a docking station, a monitor, a mouse, and/or a keyboard, among other examples associated with a place of employment of the user) via a wired or wireless connection when the first authentication process was performed and may therefore grant access to the second set of resources. In an additional example, the second server device may determine that a signal strength associated with a wireless connection between the user device and another user device (e.g., a smartwatch or headphones that are paired with the user device) satisfies (e.g., is greater than or equal to) a signal strength threshold. This may indicate that the user device and the other user device are physically near each other and that there is therefore an increased likelihood that the user is operating the user device, and not another person. The second server device therefore may grant access to the second set of resources. Alternatively, the second server device may determine that the signal strength associated with the wireless connection does not satisfy (e.g., is less) than the signal strength threshold. This may indicate that the user device and the other user device are not physically near each other and that there is therefore a decreased likelihood that the user is operating the user device, and not another person. The second server device therefore may deny access to the second set of resources.

In some implementations, the second server device may process the information associated with the first authentication process to determine an authentication score associated with the first authentication process. For example, the second server device may generate a high authentication score based on a set of criteria, such as whether the time of the first authentication process is within the approved time window, whether the location of the user device is within the approved location area, whether the user device was connected to a particular Wi-Fi network, whether the user device was connected to at least one other device, whether a signal strength associated with a wireless connection between the user device another user device satisfies a signal strength threshold (e.g., as described above). The second server device may determine a high authentication score when a threshold number of the set of criteria are satisfied and therefore may grant access to the second set of resources. Alternatively, the second server device may determine a low authentication score when a threshold number of the set of criteria are not satisfied and therefore may deny access to the second set of resources As further shown in FIG. 1E, and by reference number 155, the second server device may transmit access information (e.g., that is associated with the token authentication process) to the user device. The access information may indicate whether access to the second set of resources is granted or denied. For example, the access information may be delivered from the second server device to the user device via the network and/or the host platform, and the access information may be presented in a web browser or an application executing on the user device. If access is granted, then the second server device and/or the host platform may provide the second set of resources (e.g., that includes information hosted by the host platform, such as a web page and/or account information) to the user device for presentation via the web browser and/or the application. If access is denied, then the second server device and/or the host platform may prevent the user device from accessing the second set of resources, and/or may provide a web page or a message indicating that such access has been denied.

Further, when access is denied, the user device may cause a third authentication process to be performed, similar to that described herein in relation to FIGS. 1B-1C, to determine whether the user device should be granted or denied access to the second set of resources. For example, the user device may cause a prompt for authentication credentials to be displayed on the display screen associated with the user device (e.g., in a similar manner as that described herein in relation to FIG. 1B and reference number 110) and may receive the authentication credentials based on causing the prompt to be displayed on the display screen (e.g., in a similar manner as that described herein in relation to FIG. 1B and reference number 110). The user device may transmit the authentication credentials to the second server device to cause the third authentication process to be performed on the authentication credentials (e.g., in a similar manner as that described herein in relation to FIG. 1C and reference number 120 and reference number 125). The user device then may receive, from the second server device, additional access information indicating whether access to the second set of resources is granted or denied. If access is granted, then the second server device and/or the host platform may provide the second set of resources (e.g., that includes information hosted by the host platform, such as a web page and/or account information) to the user device (e.g., for presentation via the web browser and/or the application). If access is denied, then the second server device and/or the host platform may prevent the user device from accessing the second set of resources, and/or may provide a web page or a message indicating that such access has been denied.

As indicated above, FIGS. 1A-1E are provided as an example. Other examples may differ from what is described with regard to FIGS. 1A-1E.

Figure 2:
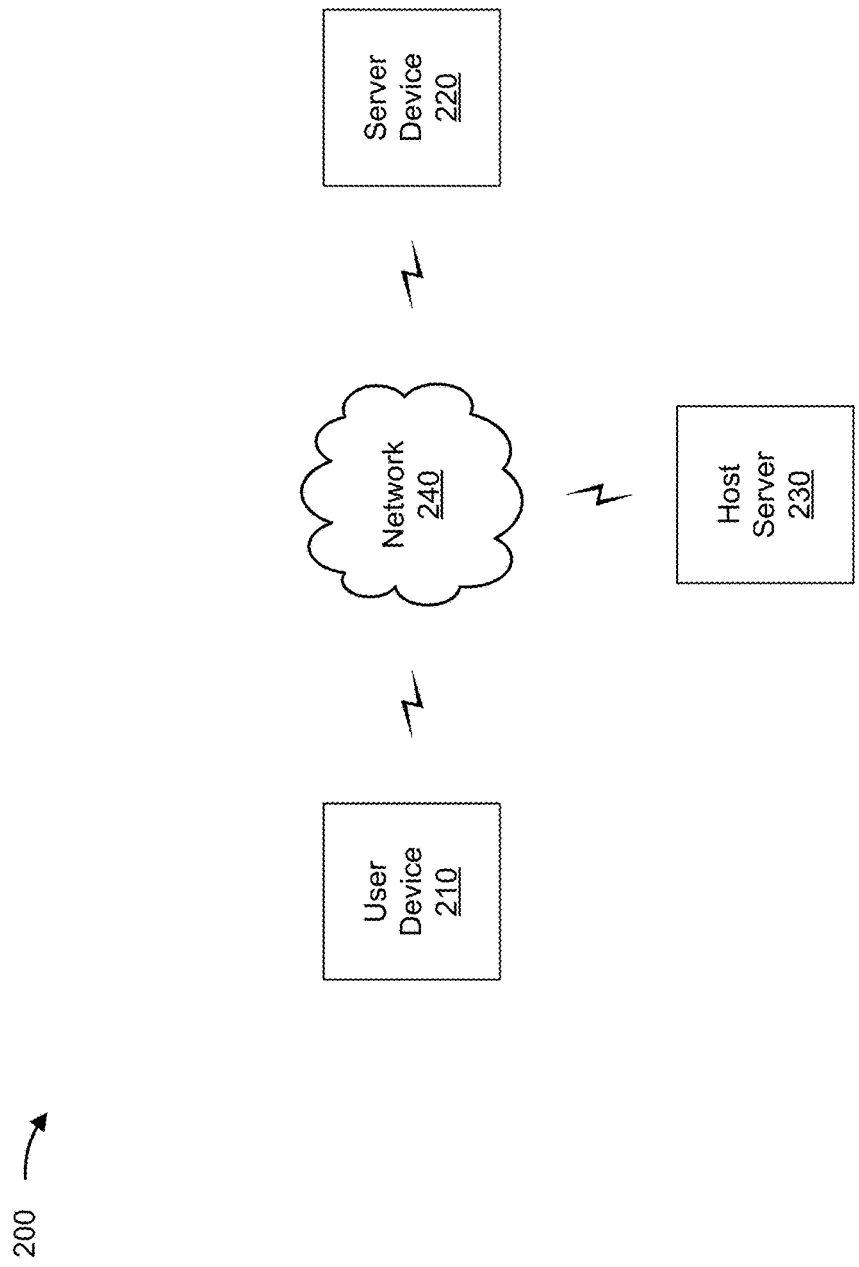
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, a host platform 230, and a network 240. Devices of environment 200 may interconnect via wired connections, wireless connections, or a combination of wired and wireless connections.

The user device 210 includes one or more devices capable of receiving, generating, storing, processing, and/or providing information associated with tokenizing authentication information, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 220 includes one or more devices capable of receiving, generating, storing, processing, providing, and/or routing information associated with tokenizing authentication information, as described elsewhere herein. The server device 220 may include a communication device and/or a computing device. For example, the server device 220 may include a server, such as an application server, a client server, a web server, a database server, a host server, a proxy server, a virtual server (e.g., executing on computing hardware), or a server in a cloud computing system. In some implementations, the server device 220 includes computing hardware used in a cloud computing environment.

The host platform 230 includes one or more devices capable of receiving, generating, storing, processing, providing, and/or routing information associated with tokenizing authentication information, as described elsewhere herein. The host platform 230 may include a communication device and/or a computing device, such as a server device. For example, the host platform 230 may include a server, such as an application server, a web server, a proxy server, a virtual server (e.g., executing on computing hardware), or a server in a cloud computing system. In some implementations, the host platform 230 includes computing hardware used in a cloud computing environment. In some implementations, the server device 220 is implemented on and integrated with the host platform 230 (e.g., to grant or deny access to resources hosted or served by the host platform 230).

The network 240 includes one or more wired and/or wireless networks. For example, the network 240 may include a cellular network, a public land mobile network, a local area network, a wide area network, a metropolitan area network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
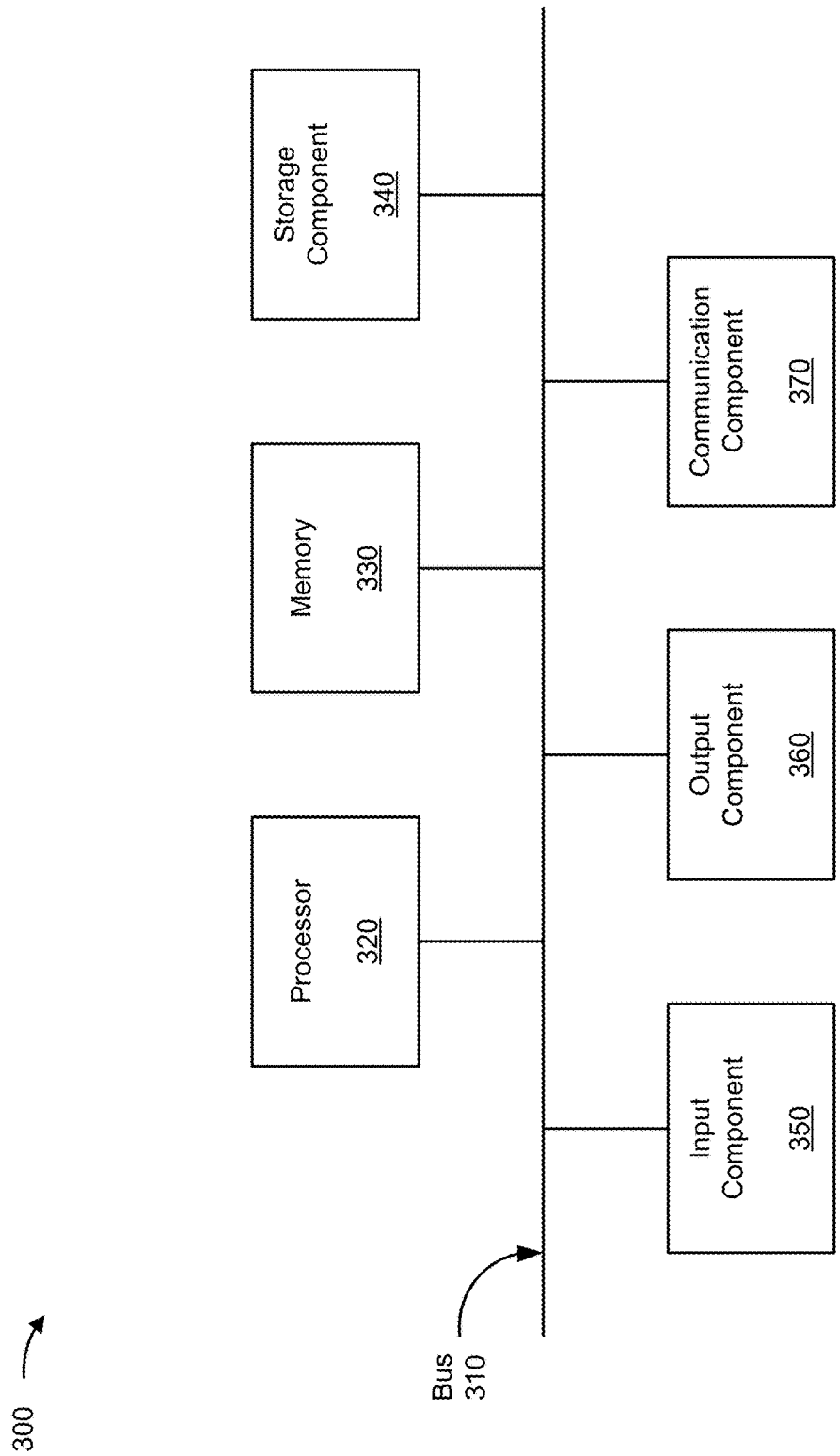
FIG. 3 is a diagram of example components of one or more devices of FIG. 2.

FIG. 3 is a diagram of example components of a device 300, which may correspond to the user device 210, the server device 220, and/or the host platform 230. In some implementations, the user device 210, the server device 220, and/or the host platform 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
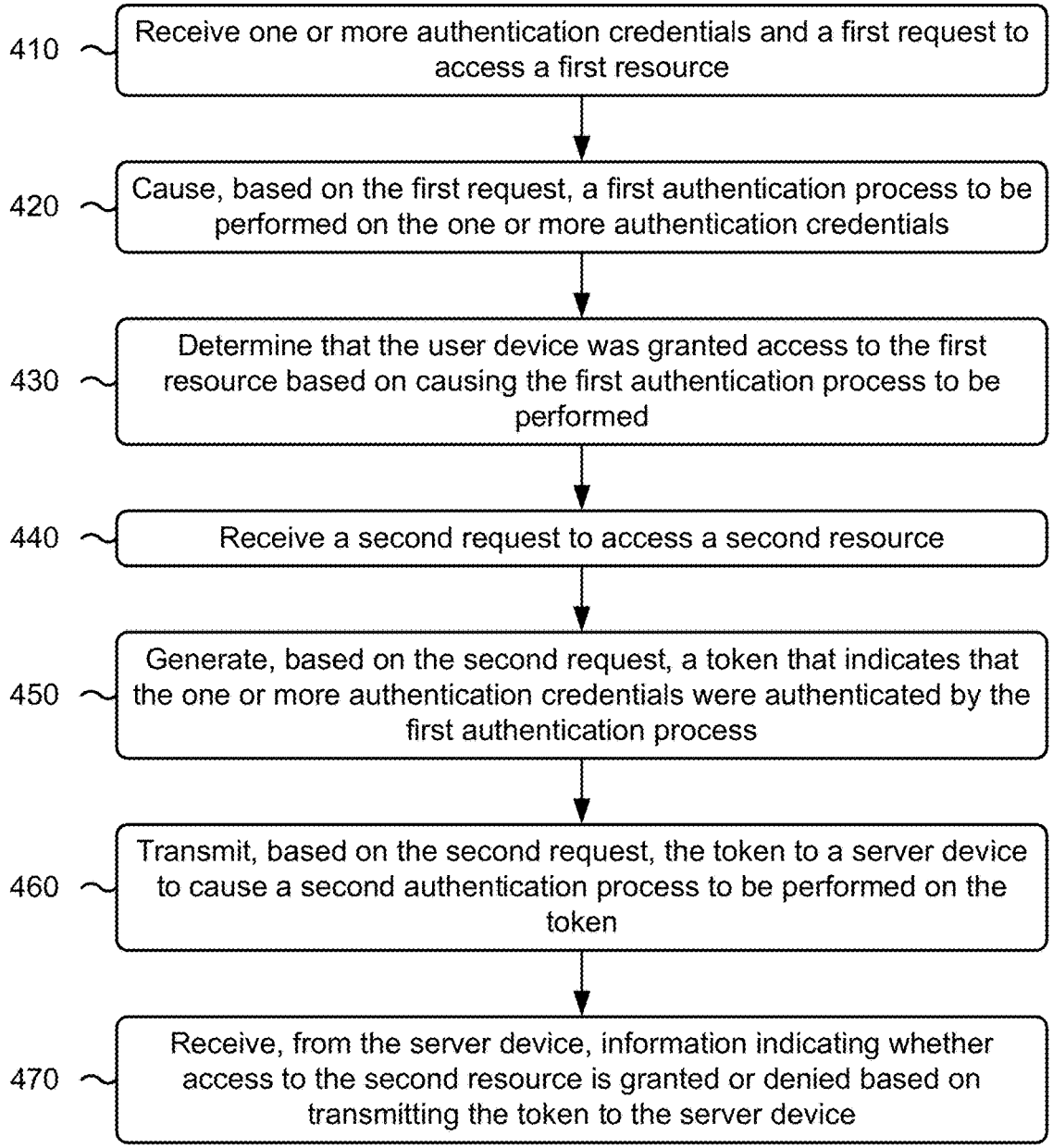
FIGS. 4-5 are flowcharts of example processes relating to tokenizing authentication information.

FIG. 4 is a flowchart of an example process 400 associated with tokenizing authentication information. In some implementations, one or more process blocks of FIG. 4 may be performed by a user device (e.g., user device 210). In some implementations, one or more process blocks of FIG. 4 may be performed by another device or a group of devices separate from or including the user device, such as a server device (e.g., server device 220) and/or a host platform (e.g., host platform 230). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving one or more authentication credentials and a first request to access a first resource (block 410). As further shown in FIG. 4, process 400 may include causing, based on the first request, a first authentication process to be performed on the one or more authentication credentials (block 420). As further shown in FIG. 4, process 400 may include determining that the user device was granted access to the first resource based on causing the first authentication process to be performed (block 430). As further shown in FIG. 4, process 400 may include receiving a second request to access a second resource (block 440). As further shown in FIG. 4, process 400 may include generating, based on the second request, a token that indicates that the one or more authentication credentials were authenticated by the first authentication process (block 450). As further shown in FIG. 4, process 400 may include transmitting, based on the second request, the token to a server device to cause a second authentication process to be performed on the token (block 460). As further shown in FIG. 4, process 400 may include receiving, from the server device, information indicating whether access to the second resource is granted or denied based on transmitting the token to the server device (block 470).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
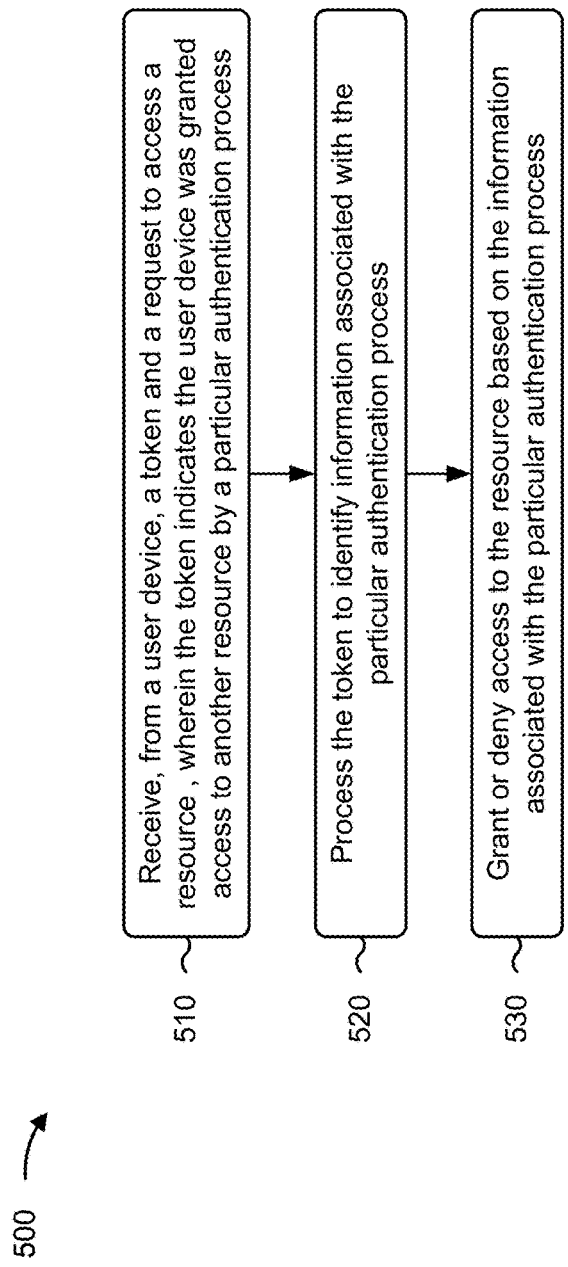

FIG. 5 is a flowchart of an example process 500 associated with tokenizing authentication information. In some implementations, one or more process blocks of FIG. 5 may be performed by a server device (e.g., server device 220). In some implementations, one or more process blocks of FIG. 5 may be performed by another device or a group of devices separate from or including the server device, such as a user device (e.g., user device 210) and/or a host platform (e.g., host platform 230). Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include receiving, from a user device, a token and a request to access a resource (block 510). As shown, in some implementations, the token indicates the user device was granted access to another resource by a particular authentication process. As further shown in FIG. 5, process 500 may include processing the token to identify information associated with the particular authentication process (block 520). As further shown in FIG. 5, process 500 may include granting or denying access to the resource based on the information associated with the particular authentication process (block 530).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user device, comprising:
one or more memories; and
one or more processors, coupled to the one or more memories, configured to:
  receive one or more authentication credentials and a first request to access a first resource;
  cause, based on the first request, a first authentication process to be performed on the one or more authentication credentials;
  determine that the user device was granted access to the first resource based on causing the first authentication process to be performed;
  receive a second request to access a second resource;
  generate, based on the second request, a token that indicates that the one or more authentication credentials were authenticated by the first authentication process;
  transmit, based on the second request, the token to a server device to cause a second authentication process to be performed on the token,
    wherein the second authentication process is based on determining an authentication score associated with the first authentication process, and
    wherein the authentication score is based on determining whether a signal strength associated with a connection between the user device and another user device satisfies a signal strength threshold and at least one of:
      whether a time associated with the first authentication process is within an approved time window,
      whether a location associated with the first authentication process is within an approved location area, or
      whether the user device was connected to the another user device when the first authentication process was performed; and
  receive, from the server device and based on the authentication score, information indicating whether access to the second resource is granted or denied.

2. The user device of claim 1, wherein the one or more authentication credentials comprise one or more biometric parameters associated with a user of the user device,
  wherein the one or more processors, to cause the first authentication process to be performed on the one or more authentication credentials, are configured to:
    process the one or more authentication credentials using at least one biometric authentication technique associated with the first authentication process.

3. The user device of claim 1, wherein the one or more processors, to cause the first authentication process to be performed on the one or more authentication credentials, are configured to:
  transmit the one or more authentication credentials to another server device to cause the other server device to process the one or more authentication credentials using the first authentication process.

4. The user device of claim 1, wherein the one or more processors, to determine that the user device was granted access to the first resource, are configured to:
  monitor a data structure that stores authentication event information associated with the user device;
  determine, based on monitoring the data structure, that an entry in the data structure is associated with the one or more authentication credentials; and
  process the entry to determine that the one or more authentication credentials were authenticated by the first authentication process and that the user device was granted access to the first resource.

5. The user device of claim 1, wherein the one or more processors, to determine that the one or more authentication credentials were authenticated by the first authentication process, are configured to:
  monitor an electronic message account associated with the user device;
  determine, based on monitoring the electronic message account, that at least one electronic message is associated with the one or more authentication credentials; and
  process the at least one electronic message to determine that the one or more authentication credentials were authenticated by the first authentication process and that the user device was granted access to the first resource.

6. The user device of claim 1, wherein the one or more processors, to determine that the one or more authentication credentials were authenticated by the first authentication process, are configured to:
  obtain information related to a webpage that is presented on the user device; and
  process the information related to the webpage to determine that the one or more authentication credentials were authenticated by the first authentication process and that the user device was granted access to the first resource.

7. The user device of claim 1, wherein the token includes at least one of:
  information identifying the user device;
  information indicating that the first authentication process was used to grant access to the first resource;
  information indicating the time when the first authentication process was performed;
  information identifying the location of the user device; or
  information identifying one or more connection characteristics of the user device.

8. The user device of claim 1, wherein the token is an encrypted token.

9. A method of tokenizing authentication information, comprising:
  determining, by a user device, the user device was granted access to a first set of resources by a first authentication process;
  receiving, by the user device, a request to access a second set of resources;
  generating, by the user device and based on the request, a token that indicates that the user device was granted access to the first set of resources by the first authentication process;
  transmitting, by the user device and based on the request, the token to a server device to cause a second authentication process to be performed on the token,
    wherein the second authentication process is based on determining an authentication score associated with the first authentication process, and wherein the authentication score is based on determining whether a signal strength associated with a connection between the user device and another user device satisfies a signal strength threshold and at least one of:
whether a time associated with the first authentication process is within an approved time window,
whether a location associated with the first authentication process is within an approved location area, or
whether the user device was connected to the another user device when the first authentication process was performed; and
receiving, by the user device, from the server device, and based on the authentication score, access information indicating whether access to the second set of resources is granted or denied.

10. The method of claim 9, wherein the first set of resources includes at least one of:
a hardware resource of the user device;
a software resource of the user device; or
a network resource associated with the server device.

11. The method of claim 9, wherein determining that the user device was granted access to the first set of resources by the first authentication process comprises:
monitoring a data structure that stores authentication event information associated with the user device;
determining, based on monitoring the data structure, that an entry in the data structure is associated with the first authentication process; and
processing the entry to determine that the user device was granted access to the first set of resources by the first authentication process.

12. The method of claim 9, wherein determining that the user device was granted access to the first set of resources by the first authentication process comprises:
monitoring an electronic message account associated with the user device;
determining, based on monitoring the electronic message account, that at least one electronic message is associated with the first authentication process; and
processing the at least one electronic message to determine that the user device was granted access to the first set of resources by the first authentication process.

13. The method of claim 9, wherein determining that the user device was granted access to the first set of resources by the first authentication process comprises:
identifying one or more communications associated with the user device accessing the first set of resources; and
processing the one or more communications to determine that the user device was granted access to the first set of resources by the first authentication process.

14. The method of claim 9, wherein the access information indicates that access to the second set of resources is granted, and
wherein the method further comprises:
causing the access information to be displayed on a display screen of the user device.

15. The method of claim 9, wherein the access information indicates that access to the second set of resources is denied, and
wherein the method further comprises:
causing a prompt for authentication credentials to be displayed on a display screen associated with the user device;
receiving the authentication credentials based on causing the prompt to be displayed on the display screen;
transmitting the authentication credentials to the server device to cause a third authentication process to be performed on the authentication credentials; and
receiving, from the server device, additional access information indicating whether access to the second set of resources is granted or denied based on transmitting the authentication credentials to the server device.

16. The method of claim 9, wherein the authentication score is generated based on whether a threshold number of criteria are satisfied.

17. A non-transitory computer-readable medium storing a set of instructions, the set of instructions comprising:
one or more instructions that, when executed by one or more processors of server device, cause the server device to:
receive, from a user device, a token and a request to access a resource, wherein the token indicates the user device was granted access to another resource by a particular authentication process;
process the token to identify information associated with the particular authentication process;
determine, based on the information, whether one or more criterion of a set of criteria are satisfied, wherein the set of criteria includes information indicating whether a signal strength associated with a wireless connection between the user device and another device satisfies a signal strength threshold and at least one of:
whether a time is within an approved time window,
whether a location is within an approved location area,
whether the user device was connected to a particular network, or
whether the user device was connected to the another device;
determine, based on the determination, whether a threshold number of the criterion of the set of criteria is satisfied;
generate, based on determining whether the threshold number of criterion of the set of criteria is satisfied, an authentication score associated with the particular authentication process; and
grant or deny access to the resource based on the authentication score associated with the particular authentication process.

18. The non-transitory computer-readable medium of claim 17, wherein the token is an encrypted token,
wherein the one or more instructions, that cause the server device to process the token to identify information associated with the particular authentication process, cause the server device to:
process, using a decryption algorithm, the token to identify the information associated with the particular authentication process.

19. The user device of claim 1, wherein the authentication score is generated based on whether a threshold number of criteria are satisfied.

20. The non-transitory computer-readable medium of claim 17, wherein the one or more instructions, when executed by the one or more processors, further cause the server device to:
transmit, to the user device, information associated with indicating whether access to the resource is granted.

* * * * *

UNITED STATES PATENT AND TRADEMARK OFFICE
CERTIFICATE OF CORRECTION

PATENT NO. : 12,261,837 B2
APPLICATION NO. : 17/343340
DATED : March 25, 2025
INVENTOR(S) : Galen Rafferty et al.

Page 1 of 1

It is certified that error appears in the above-identified patent and that said Letters Patent is hereby corrected as shown below:

In the Claims

In Claim 17, Column 18, Line 15, "more processors of server device, cause the server" should be changed to -- more processors of a server device, cause the server --.

Signed and Sealed this
Twenty-ninth Day of April, 2025

Coke Morgan Stewart
*Acting Director of the United States Patent and Trademark Office*